(12) United States Patent
Thompson

(10) Patent No.: US 10,888,043 B2
(45) Date of Patent: Jan. 12, 2021

(54) SELF-PROPELLED BALING VEHICLE

(71) Applicant: Vermeer Manufacturing Company, Pella, IA (US)

(72) Inventor: Kent L. Thompson, Otley, IA (US)

(73) Assignee: Vermeer Manufacturing Company, Pella, IA (US)

( * ) Notice: Subject to any disclaimer, the term of this patent is extended or adjusted under 35 U.S.C. 154(b) by 135 days.

(21) Appl. No.: 16/099,311

(22) PCT Filed: May 19, 2017

(86) PCT No.: PCT/US2017/033519
§ 371 (c)(1),
(2) Date: Nov. 6, 2018

(87) PCT Pub. No.: WO2017/201392
PCT Pub. Date: Nov. 23, 2017

(65) Prior Publication Data
US 2019/0191615 A1    Jun. 27, 2019

Related U.S. Application Data

(60) Provisional application No. 62/338,577, filed on May 19, 2016.

(51) Int. Cl.
*A01F 15/08* (2006.01)
*A01F 15/07* (2006.01)
(Continued)

(52) U.S. Cl.
CPC ............ *A01B 69/007* (2013.01); *A01D 67/00* (2013.01); *A01F 15/07* (2013.01); *A01F 15/08* (2013.01); *A01F 15/085* (2013.01); *B62D 11/02* (2013.01)

(58) Field of Classification Search
CPC ........ A01F 15/07; A01F 15/08; A01F 15/085; A01B 69/007; A01D 67/00; B62D 11/02
(Continued)

(56) References Cited

U.S. PATENT DOCUMENTS 2,818,125 A    12/1957   Vogelaar
3,234,856 A    2/1966    Martin
(Continued)

FOREIGN PATENT DOCUMENTS

DE    19544109 A1    11/1995
EP    1695609 A1     8/2006
(Continued)

OTHER PUBLICATIONS

International Search Report and Written Opinion for International Application No. PCT/US2017/033519, dated Aug. 4, 2017, 10 pages.
(Continued)

*Primary Examiner* — Jimmy T Nguyen
(74) *Attorney, Agent, or Firm* — Armstrong Teasdale LLP

(57) ABSTRACT

Self-propelled vehicles for forming bales of crop or forage material are disclosed. The self-propelled baling vehicles include independently driven real wheels and front caster wheels that allow the baling vehicle to turn with a counter-steer profile. In some embodiments, the center of mass of the formed bale is toward the rear of the vehicle to improve the weight distribution of the vehicle.

20 Claims, 12 Drawing Sheets

(51) Int. Cl.
*A01B 69/00* (2006.01)
*B62D 11/02* (2006.01)
*A01D 67/00* (2006.01)

(58) Field of Classification Search
USPC ........................................ 100/88, 87; 56/341
See application file for complete search history.

(56) References Cited

U.S. PATENT DOCUMENTS

| | | | |
|---|---|---|---|
| 3,698,523 | A | 10/1972 | Bellinger et al. |
| 4,180,282 | A | 12/1979 | Henning et al. |
| 5,029,436 | A | 7/1991 | Nils et al. |
| 5,551,218 | A * | 9/1996 | Henderson .............. A01F 15/07 |
| | | | 100/13 |
| 5,964,540 | A | 10/1999 | Shiina et al. |
| 6,059,055 | A | 5/2000 | Velke et al. |
| 6,192,666 | B1 | 2/2001 | Sugden et al. |
| 6,857,254 | B2 | 2/2005 | Melone et al. |
| 6,941,740 | B2 | 9/2005 | Fox et al. |
| 7,040,425 | B2 | 5/2006 | Hammonds et al. |
| 7,459,870 | B2 | 6/2008 | Beck et al. |
| 7,549,279 | B2 | 6/2009 | Mérant et al. |
| 7,631,716 | B2 | 12/2009 | Fox et al. |
| 7,918,304 | B2 | 4/2011 | Perry et al. |
| 8,250,843 | B2 | 8/2012 | Campbell et al. |
| 8,496,256 | B2 | 7/2013 | Bebernes et al. |
| 8,690,171 | B2 | 4/2014 | Clark |
| 8,733,770 | B2 | 5/2014 | Nafziger et al. |
| 8,893,831 | B2 | 11/2014 | Otto |
| 8,950,520 | B2 | 2/2015 | Hauser et al. |
| 8,985,252 | B2 | 3/2015 | Otto et al. |
| 8,997,902 | B2 | 4/2015 | Pierce et al. |
| 9,120,504 | B2 | 9/2015 | Bebernes et al. |
| 9,380,737 | B2 | 7/2016 | Bebernes et al. |
| 9,415,651 | B2 | 8/2016 | Knight et al. |
| 9,421,999 | B2 | 8/2016 | Rotole et al. |
| 9,439,341 | B2 | 9/2016 | Bebernes et al. |
| 2004/0130114 | A1 | 7/2004 | Iveichholdt |
| 2005/0115746 | A1 | 6/2005 | Dunn et al. |
| 2006/0236670 | A1 | 10/2006 | Glasford et al. |
| 2007/0209530 | A1 | 9/2007 | Viaud |
| 2008/0202857 | A1 | 8/2008 | Waltz et al. |
| 2009/0079254 | A1 | 3/2009 | Jacobs et al. |
| 2010/0011733 | A1 | 1/2010 | Godfrey et al. |
| 2010/0326037 | A1 | 12/2010 | Dillon |
| 2010/0326292 | A1 * | 12/2010 | Dillon ................... A01F 15/106 |
| | | | 100/2 |
| 2011/0023441 | A1 * | 2/2011 | Herron .................... A01D 43/06 |
| | | | 56/341 |
| 2011/0109054 | A1 | 5/2011 | Holtan et al. |
| 2011/0239607 | A1 | 10/2011 | Campbell et al. |
| 2013/0056287 | A1 | 3/2013 | Park et al. |
| 2013/0075169 | A1 | 3/2013 | Otto |
| 2013/0153180 | A1 | 6/2013 | Montocchio et al. |
| 2014/0138166 | A1 | 5/2014 | Otto et al. |
| 2014/0157748 | A1 | 6/2014 | Olander et al. |
| 2015/0017901 | A1 | 1/2015 | Pfohl et al. |
| 2015/0114020 | A1 | 4/2015 | Bergman et al. |
| 2015/0191201 | A1 | 7/2015 | Schaedler et al. |
| 2015/0223386 | A1 | 8/2015 | Nafziger et al. |
| 2015/0272007 | A1 * | 10/2015 | Smith ................... A01D 90/10 |
| | | | 414/24.5 |

FOREIGN PATENT DOCUMENTS

| | | |
|---|---|---|
| EP | 3162189 A2 | 5/2017 |
| FR | 2552014 A1 | 3/1985 |
| GB | 2309014 A | 1/1996 |
| JP | 2013118835 A | 6/2013 |
| KR | 20080113535 A | 12/2008 |
| KR | 101404604 B1 | 6/2014 |
| WO | 9825447 A1 | 6/1998 |
| WO | 2005053377 A2 | 6/2005 |

OTHER PUBLICATIONS

International Search Report and Written Opinion for International Application No. PCT/US2017/033524, dated Jul. 31, 2017, 9 pages.
International Search Report and Written Opinion for International Application No. PCT/US17/33605, dated Aug. 24, 2017, 10 pages.
"He Self-Propelled His Two Hay Balers", Farm Show, 1989, vol. 13, Issue No. 3, p. 1.
"Self-Propelled Baler", Farm Show, 1985, vol. 9, Issue No. 2, p. 1.
"One-Pass Self Propelled Baler", Farm Show, 2002, vol. 26, Issue No. 1, p. 44.
Épandage de compost de fumier de champignon, 1 page, retrieved from https://youtu.be/q1LwI1KW4Kc, Jan. 28, 2015.
New Holland Braud VL 6080 Grape Harvester, 1 page, retrieved from https://www.youtube.com/watch?v=Xn5wuyyx3bA, Aug. 29, 2014.
Chapter 3 Pneumatic 3 Position Cylinders, 1 page, retrieved from https://www.youtube.com/watch?v=NGWKghY-w0A, Mar. 19, 2014.
3380 + 80" Cut Articulating Mower, 1 page, retrieved from http://lastec.com/en/Products/Zero-Turn-Mowers/3380, available before May 19, 2016.
Terragator, 1 page, retrieved from http://www.applylikeapro.com/terragator.html, available before May 19, 2016.
Condor, 1 page, retrieved from http://www.agrifac.com/condor/condor/condor, available before May 19, 2016.
Hagie, 1 page, retrieved from http://www.hagie.com/hagieinnovation.aspx, available before May 19, 2016.
"Big Baler Off to Field Under Own Power", the Western Producer, Mar. 1, 2013.
Deutz-Fahr PowerPress 120H, 1 page, retrieved from http://www.youtube.com/watch?v=mFNPwge97B8, available before May 19, 2016.
Deutz-Fahr PowerPress 120H, 1 page, retrieved from http://www.youtube.com/watch?v=DONcEcn55sl, available before May 19, 2016.
Freeman Self Propelled Side Feed Baler, 1 page, retrieved from https://www.youtube.com/watch?v=VhU0A1xSmRU, available before May 19, 2016.
Freeman Self Propelled Side Feed Baler, 1 page, retrieved from htttps://www.youtube.com/watch?=VhUOA1xSmRU&t=84s, available before May 19, 2016.

* cited by examiner

SELF-PROPELLED BALING VEHICLE

CROSS-REFERENCE TO RELATED APPLICATION

The present application is a 35 U.S.C. § 371 national stage application of PCT/US2017/033519, filed May 19, 2017, which claims the benefit of U.S. Provisional Patent Application No. 62/338,577, filed May 19, 2016, each of which is incorporated herein by reference in its entirety.

FIELD OF THE DISCLOSURE

The field of the disclosure relates to self-propelled baling vehicles and, in particular, self-propelled baling vehicles that include independently driven real wheels and front caster wheel assemblies that allow the baling vehicle to turn with a zero-turning radius.

BACKGROUND

Baling of forage or crop material typically involves a baling implement that is towed by a pull vehicle such as a tractor. The baling operation itself is relatively expensive as both the baling implement and a separate tractor must be purchased. Self-propelled baling vehicles have been developed; however, previous designs have been commercially limited as they suffer from poor maneuverability, do not provide sufficient visibility for the operator and provide a poor quality of operator ride.

A need exists for new baling vehicles that are self-propelled, that are highly maneuverable and that improve the operator ride while providing sufficient maneuverability.

This section is intended to introduce the reader to various aspects of art that may be related to various aspects of the disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

SUMMARY

One aspect of the present disclosure is directed to a self-propelled baling vehicle for forming a bale of material. The vehicle has a vertical axis and a longitudinal axis. The baling vehicle includes a chassis and first and second rear drive wheels attached to the chassis. The first and second rear drive wheels each have a rotational axis. The vehicle includes drive systems for independently controlling a drive speed of each of the first and second rear drive wheels so that the speed of the first drive wheel is selectively controllable relative to a speed of the second drive wheel and so that differences in the first drive wheel speed and the second drive wheel speed enable vehicle steering. A front caster wheel is connected to the chassis. The front caster wheel is mounted on a suspension mechanism to allow the front caster wheel to move toward the chassis relative to the vertical axis. The front caster wheel has a rotational axis. A distance $D_1$ separates the rotational axes of the rear drive wheels and the rotational axis of the front caster wheel. The vehicle includes a baling chamber for forming the bale. The chamber has a central axis that is transverse to the longitudinal axis and intersects a center of mass of the completed bale. The central axis is (1) at or rearward to the rotational axes of the first and second rear drive wheels or (2) forward to the rotational axes of the first and second rear drive wheels with the distance between the central axis and the rotational axes of the first and second rear drive wheels being less than about $0.25*D_1$.

Another aspect of the present disclosure is directed to a self-propelled baling vehicle for forming a bale of material. The baling vehicle has a weight and includes a chassis and first and second rear drive wheels attached to the chassis. The first and second rear drive wheels each have a rotational axis. At least about 60% of the weight of the vehicle is supported by the rear drive wheels. The vehicle includes drive systems for independently controlling a drive speed of each of the first and second rear drive wheels so that the speed of the first drive wheel is selectively controllable relative to a speed of the second drive wheel and so that differences in the first drive wheel speed and the second drive wheel speed enable vehicle steering. A front caster wheel is connected to the chassis. The vehicle includes a baling chamber for forming the bale.

Yet a further aspect of the present disclosure is directed to a self-propelled baling vehicle for forming a bale of material. The vehicle includes a chassis and first and second rear drive wheels attached to the chassis. The first and second rear drive wheels each have a rotational axis. The vehicle includes drive systems for independently controlling a drive speed of each of the first and second rear drive wheels so that the speed of the first drive wheel is selectively controllable relative to a speed of the second drive wheel and so that differences in the first drive wheel speed and the second drive wheel speed enable vehicle steering. A front caster wheel is connected to the chassis. The vehicle includes a cab enclosing an operator station and a baling chamber for forming the bale. The vehicle includes an engine for propelling the vehicle. The engine is disposed between the cab and the baling chamber.

Various refinements exist of the features noted in relation to the above-mentioned aspects of the present disclosure. Further features may also be incorporated in the above-mentioned aspects of the present disclosure as well. These refinements and additional features may exist individually or in any combination. For instance, various features discussed below in relation to any of the illustrated embodiments of the present disclosure may be incorporated into any of the above-described aspects of the present disclosure, alone or in any combination.

BRIEF DESCRIPTION OF THE DRAWINGS

Corresponding reference characters indicate corresponding parts throughout the drawings.

DETAILED DESCRIPTION

Figure 1:
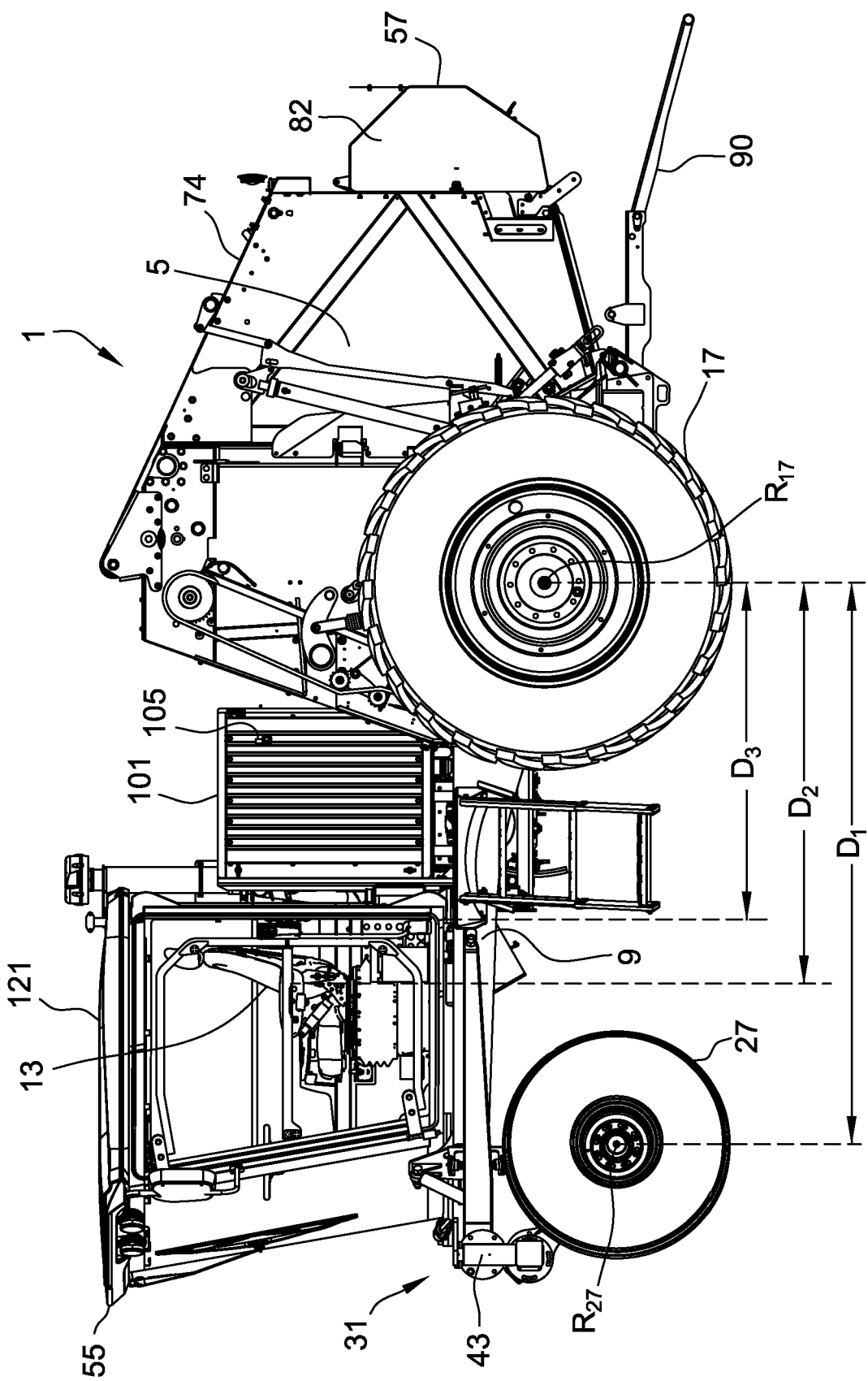
FIG. 1 is a side view of a self-propelled baling vehicle.

A self-propelled baling vehicle for forming a bale of crop or forage material is generally referred to as "1" in FIG. 1. The vehicle 1 includes a baling device 5 that is supported by a chassis 9. A pick-up device 11 (FIG. 2) rotates to feed crop or forage material to the baling device 5. The vehicle 1 is controlled from an operator station 13 and is powered by an engine 101 (FIG. 1). Each of the operator station 13, engine 101 and baling device 5 are supported by the chassis 9 (i.e., the engine 101 is not part of a towed vehicle such as a tractor that releasably connects to the baling device 5 by a hitch assembly attached to an implement tongue).

The vehicle 1 includes first and second rear drive wheels 17 that are driven by first and second motors 23 (FIG. 8) that are disposed within the drive wheels. The rear drive wheels 17 each have a rotational axis $R_{17}$ about which the drive wheels 17 rotate. In the illustrated embodiment, the wheels 17 have a common rotational axis $R_{17}$. In other embodiments, the wheels 17 are offset from each other and have different axes of rotation. The drive wheels 17 are attached to the chassis 9. In some embodiments, the drive wheels 17 have a diameter of at least about 4 feet, or at least about 5 feet or even at least about 6 feet (e.g., from about 4 feet to about 8 feet or from about 4 feet to about 6 feet).

Figure 3:
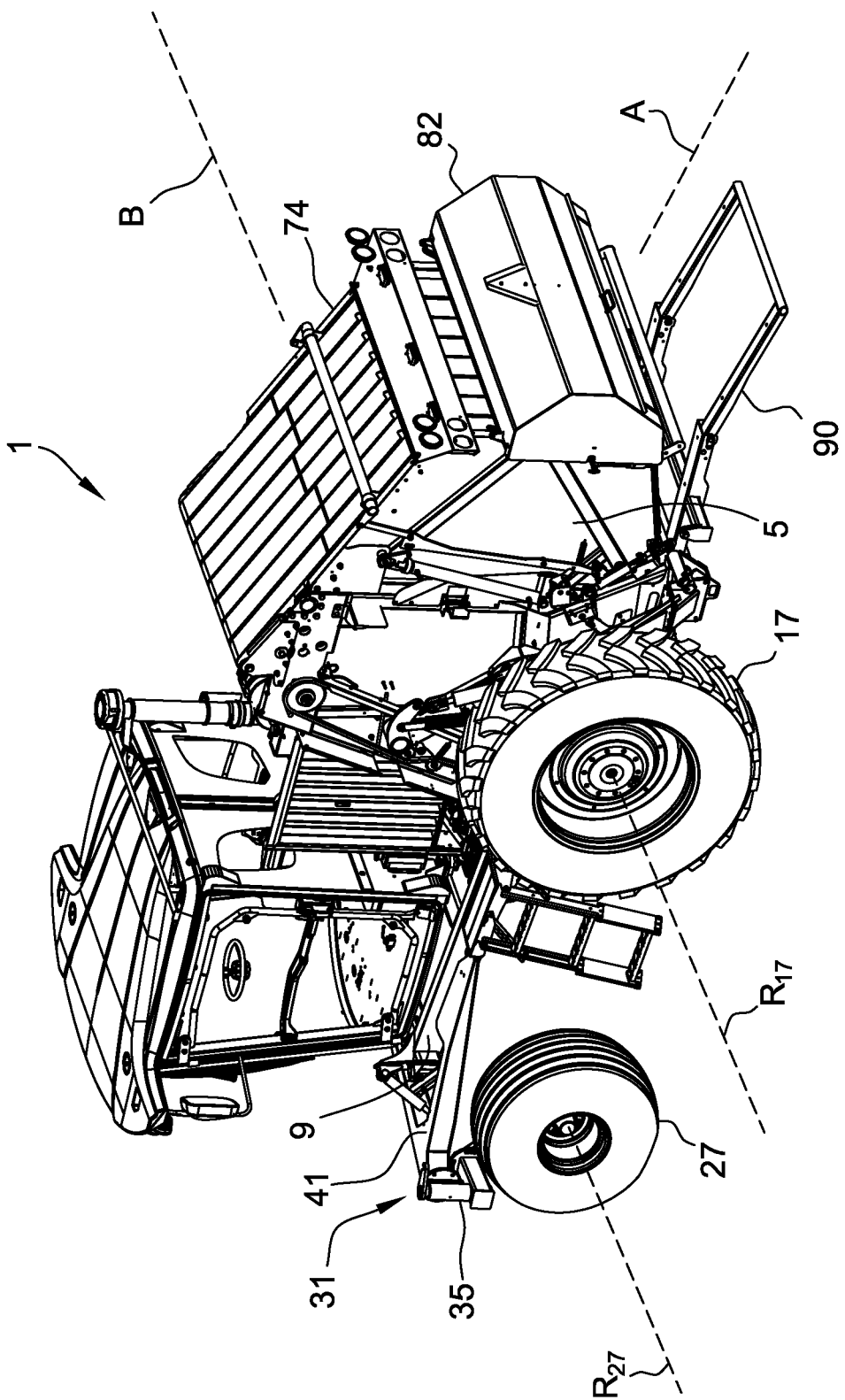
FIG. 3 is a perspective view of the self-propelled baling vehicle.

The rear wheels 17 are fixed to the chassis 9 such that the wheels 17 maintain parallel alignment with a longitudinal axis A (FIG. 3) of the vehicle 1 (i.e., do not pivot with respect to the chassis 9). In some embodiments, the rear drive wheels 17 are not suspended from the chassis 9. In other embodiments, the rear drive wheels 17 are suspended.

Figure 2:
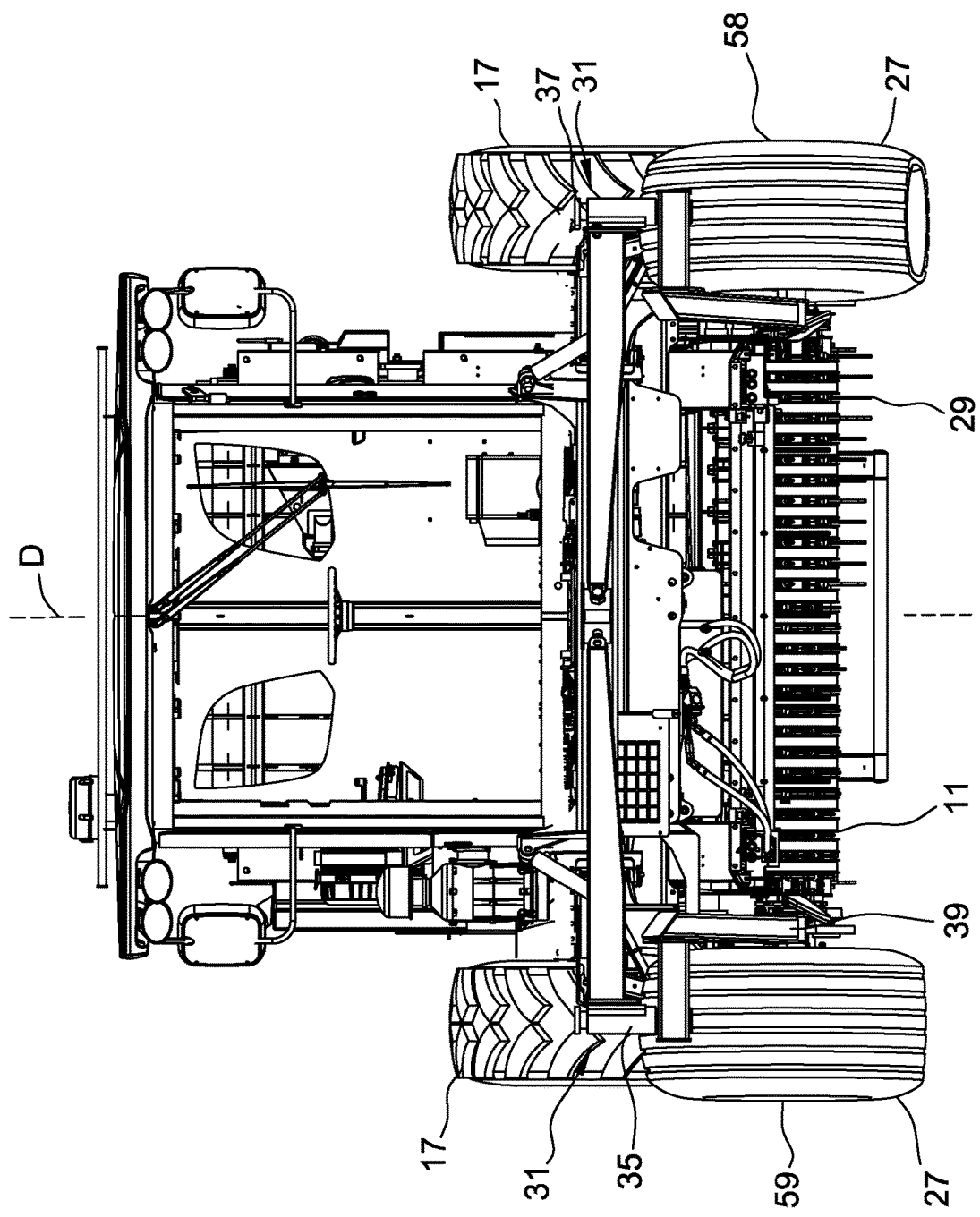
FIG. 2 is a front view of the self-propelled baling vehicle.

The longitudinal axis A (FIG. 3) of the vehicle 1 extends from a front 55 (FIG. 1) to a rear 57 of the vehicle 1. As referenced herein, the "front" of the vehicle 1 refers to a leading portion or end of the vehicle 1 relative to the longitudinal axis during bale formation. The "rear" refers to the trailing portion or end relative to the longitudinal axis A during bale formation. Similarly, the terms "front caster wheels" and "rear wheels" refer to the relative position of the wheels relative to the direction of travel of the vehicle 1 during baling. The vehicle 1 also includes a lateral axis B (FIG. 3) that extends from a first side 58 to a second side 59 of the vehicle 1 and that is transverse to the longitudinal axis A. The vehicle 1 also includes a vertical axis D (FIG. 2).

Figure 8:
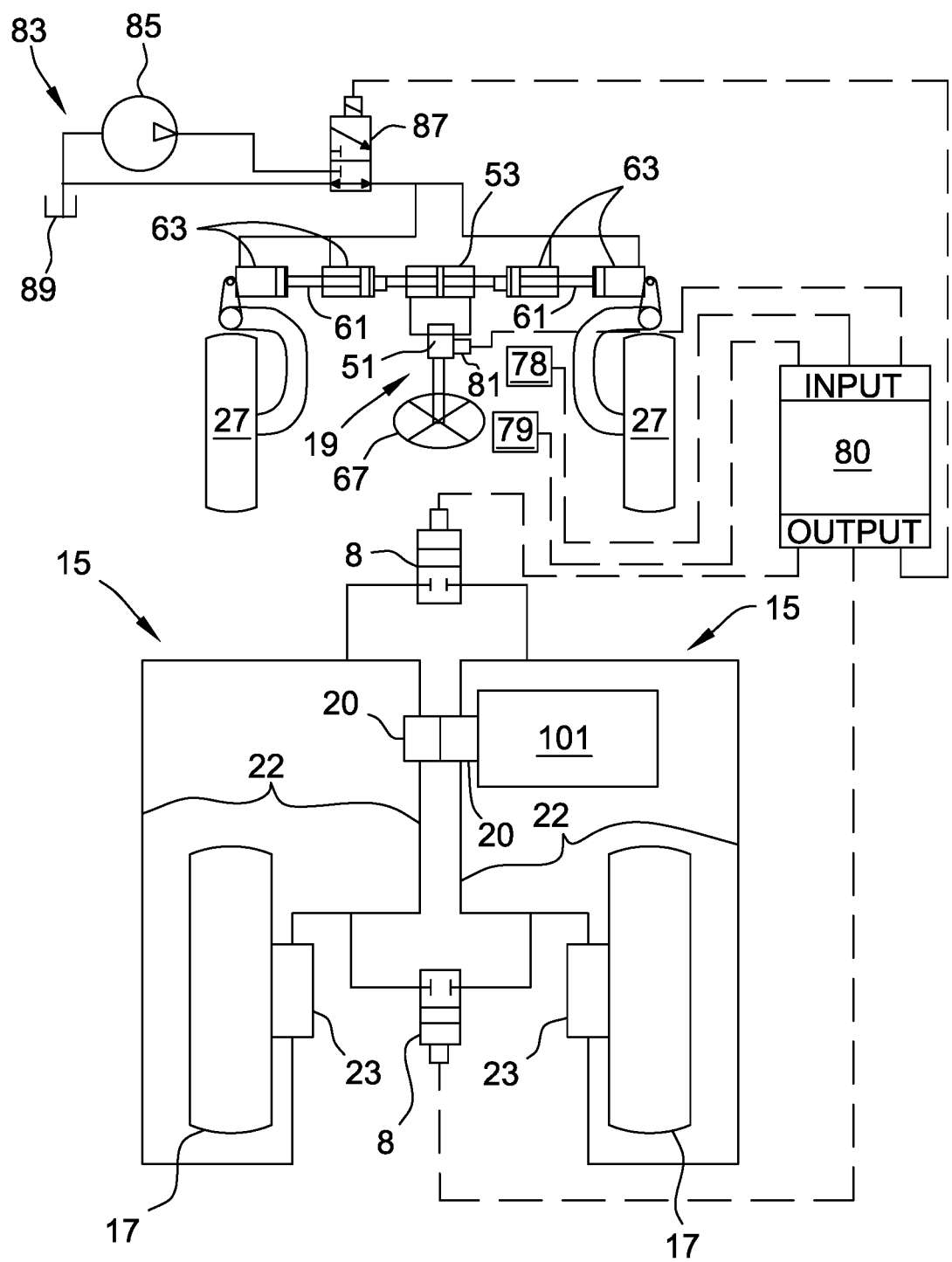
FIG. 8 is a schematic view of the self-propelled baling vehicle showing the drive systems.

With reference to FIG. 8, the first and second drive wheels 17 are each driven and controlled by separate drive systems 15. Each drive system 15 has a drive motor 23 for rotating the drive wheel 17 forward or backward. The drive motors 23 may be hydraulic motors that are driven by a pump 20 that is powered by the engine 101. Each drive wheel 17 may be controlled by a separate circuit (i.e., separate hydraulic pumps 20 with fluid lines 22 connected to the drive wheel motors 23). The first and second pumps 20 may be hydrostatic, variable displacement pumps. In some embodiments, fixed displacement or variable displacement motor(s) may be used.

The wheels 17 are powered and rotated independently by the drive systems 15. Accordingly, the wheels 17 can be rotated at different speeds by driving the motors at different speeds. In the drive wheel steering mode, the wheels 17 are driven at different speeds by the drive system 15. In this mode, the motors 23 receive different amounts of fluid from the respective pumps 20 to differentiate the speed of the wheels 17. Separate fluid lines 22 extend between each pump 20 and drive motor 23 to independently rotate the wheels 17. The direction of fluid flow may be forward or reverse to independently rotate the wheels forward or reverse to propel the vehicle forward, reverse, through an arc (e.g., as during steering) or about a vertical axis midway between the drive wheels 17 (e.g., as during zero turn steering).

The vehicle 1 includes a control system to control the drive wheels 17 and front caster wheels 27 based on inputs from an operator. The control system includes a control unit 80, speed and direction control device 78, a mode selector 79 and steering mechanism which is shown as a steering wheel 67. The speed and direction control device 78, mode selector 79 and steering wheel 67 may be controlled from the operator station 13.

The control unit 80 includes a processor and a memory. The processor processes the signals received from various sensors, selectors and control devices of the system. The memory stores instructions that are executed by the processor.

Control unit 80 may be a computer system. Computer systems, as described herein, refer to any known computing device and computer system. As described herein, all such computer systems include a processor and a memory. However, any processor in a computer system referred to herein may also refer to one or more processors wherein the processor may be in one computing device or a plurality of computing devices acting in parallel. Additionally, any memory in a computer device referred to herein may also refer to one or more memories wherein the memories may be in one computing device or a plurality of computing devices acting in parallel.

The term processor, as used herein, refers to central processing units, microprocessors, microcontrollers, reduced instruction set circuits (RISC), application specific integrated circuits (ASIC), logic circuits, and any other circuit or processor capable of executing the functions described herein. The above are examples only, and are thus not intended to limit in any way the definition and/or meaning of the term "processor."

In one embodiment, a computer program is provided to enable control unit 80, and this program is embodied on a computer readable medium. In an example embodiment, the computer system is executed on a single computer system, without requiring a connection to a server computer. In a further embodiment, the computer system is run in a Windows® environment (Windows is a registered trademark of Microsoft Corporation, Redmond, Wash.). In yet another embodiment, the computer system is run on a mainframe environment and a UNIX® server environment (UNIX is a registered trademark of X/Open Company Limited located in Reading, Berkshire, United Kingdom). Alternatively, the computer system is run in any suitable operating system environment. The computer program is flexible and designed to run in various different environments without compromising any major functionality. In some embodiments, the computer system includes multiple components distributed among a plurality of computing devices. One or more components may be in the form of computer-executable instructions embodied in a computer-readable medium.

The computer systems and processes are not limited to the specific embodiments described herein. In addition, components of each computer system and each process can be practiced independent and separate from other components and processes described herein. Each component and process also can be used in combination with other assembly packages and processes.

The mode selector 79 allows the operator to select a desired mode of operation (i.e., drive wheel steering mode or caster wheel steering mode). The control unit 80 receives the signal from the mode selector 79 and controls the mode of the steering system in response to the signal. The mode selector 79 may be, for example, part of a touch screen, a soft key, toggle switch, selection button or any other suitable interface for selecting the steering mode.

The speed and direction control device 78 is typically hand-operated and may be a sliding lever that that causes an increase in forward speed as the lever is slid forward of a neutral position and an increase in reverse direction as the lever is slid rearward of the neutral position. The speed and direction control device 78 produces a signal in response to its position and the signal is transmitted to the control unit 80. The control unit 80 produces an output signal transmitted to the hydraulic pumps 20 that drive the rear wheels 17. The speed may also be controlled by a throttle that controls the engine speed. The vehicle 1 may be stopped by moving the direction and speed control device 78 to a zero-speed setting and/or by operating foot brake levers.

In the illustrated embodiment, steering may be performed by a steering mechanism shown as a steering wheel 67 which regulates the steering system. For example, in the drive wheel steering mode, a sensor 81 measures the direction and angle of the steering wheel 67 and sends signals to the control unit 80. The control unit 80 produces a signal that is transmitted to the hydraulic pumps 20 to independently regulate the rotational speeds of the first and second drive wheels 17 (i.e., the rotation speed and direction of rotation of each drive wheel 17

In other embodiments, speed and/or steering may be controlled by different operator controls such as wheel levers, digital inputs, joysticks, dual sticks, and headsets.

In some embodiments, the self-propelled vehicle 1 is configured to optionally operate autonomously. The vehicle 1 may include sensors (e.g., cameras, GPS sensors and the like) that sense the position of the windrow and/or that may sense the position of the vehicle in the field. The vehicle 1 may also include a controller that sends signals to the first and second rear wheel pumps or to various actuators to independently control the first and second rear drive wheels. In some embodiments, the field in which the vehicle is propelled is mapped and the field map is used to autonomously control the operation of the vehicle in the field. In such embodiments, the vehicle may include a riding station to carry an operator or the operator station may be eliminated.

The self-propelled vehicle 1 includes first and second front caster wheels 27 that are pivotally connected to the chassis 9 about a vertical pivot axis (which may be offset from the vertical axis at a caster angle). The front and second caster wheels 27 swing below a portion of the chassis 9. The front caster wheels 27 are spaced to allow the windrow of crop or forage material to pass between the front caster wheels 27 and engage the pickup device 11. As shown in FIG. 2, teeth 29 of the pick-up device 11 are positioned between the front caster wheels 27 relative to a lateral axis B (FIG. 3) of the vehicle 1. In some embodiments, the front caster wheels 27 are separated by at least five feet or at least about seven feet. Similarly, the rear wheels 17 are spaced to allow the baling device 5 (FIG. 1) to be positioned between the rear wheels. In some embodiments, the vehicle 1 includes a single front caster wheel.

The front caster wheels 27 are independently suspended from the chassis to absorb forces transmitted during travel over uneven terrain. The front caster wheels 27 pivot with respect to the chassis 9 about their pivot axis to allow the wheels 27 to be aligned with the direction of travel of the vehicle 1 and as a response to the differential speed of the first and second drive wheels 17. In some embodiments, the front caster wheels 27 are freely pivotal and turn only as a response to the differential speed of the rear drive wheels 17. In other embodiments, the front caster wheels 27 are steered (e.g., controlled to coordinate turning with rear drive wheels or steered independently of the rear drive wheels 17).

Each front caster wheel 27 has a rotational axis $R_{27}$ (FIG. 3) about which the front caster wheels 27 rotate. In the illustrated embodiment, the wheels 27 have a common rotational axis $R_{27}$.

The front caster wheels 27 may be part of first and second swivel caster assemblies 31. Generally the first and second swivel caster assemblies 31 and subframes 41 described below are symmetric and description herein of an assembly or subframe also applies to the second assembly or subframe (e.g., description of a hub of the assembly indicates that the first assembly has a first hub and that the second assembly has a second hub). Each assembly 31 includes a hub 35 (FIG. 4) and a caster shaft 37 (which may be referred to as a "kingpin") that rotates within the hub 35. The swivel caster assemblies 31 may include bushings or bearings within the hub 35 that allow for rotation of the shaft 37 within the hub 35. Each caster shaft 37 is connected to a leg assembly 42 that connects to the front caster wheel axle. In the illustrated embodiment, the leg assembly 42 includes a single leg that attaches to an inner side of the wheel axle. In other embodiments, the leg assembly includes two legs that connect to the axle of the front caster wheel on each side of the wheel (as with a caster fork).

Figure 9:
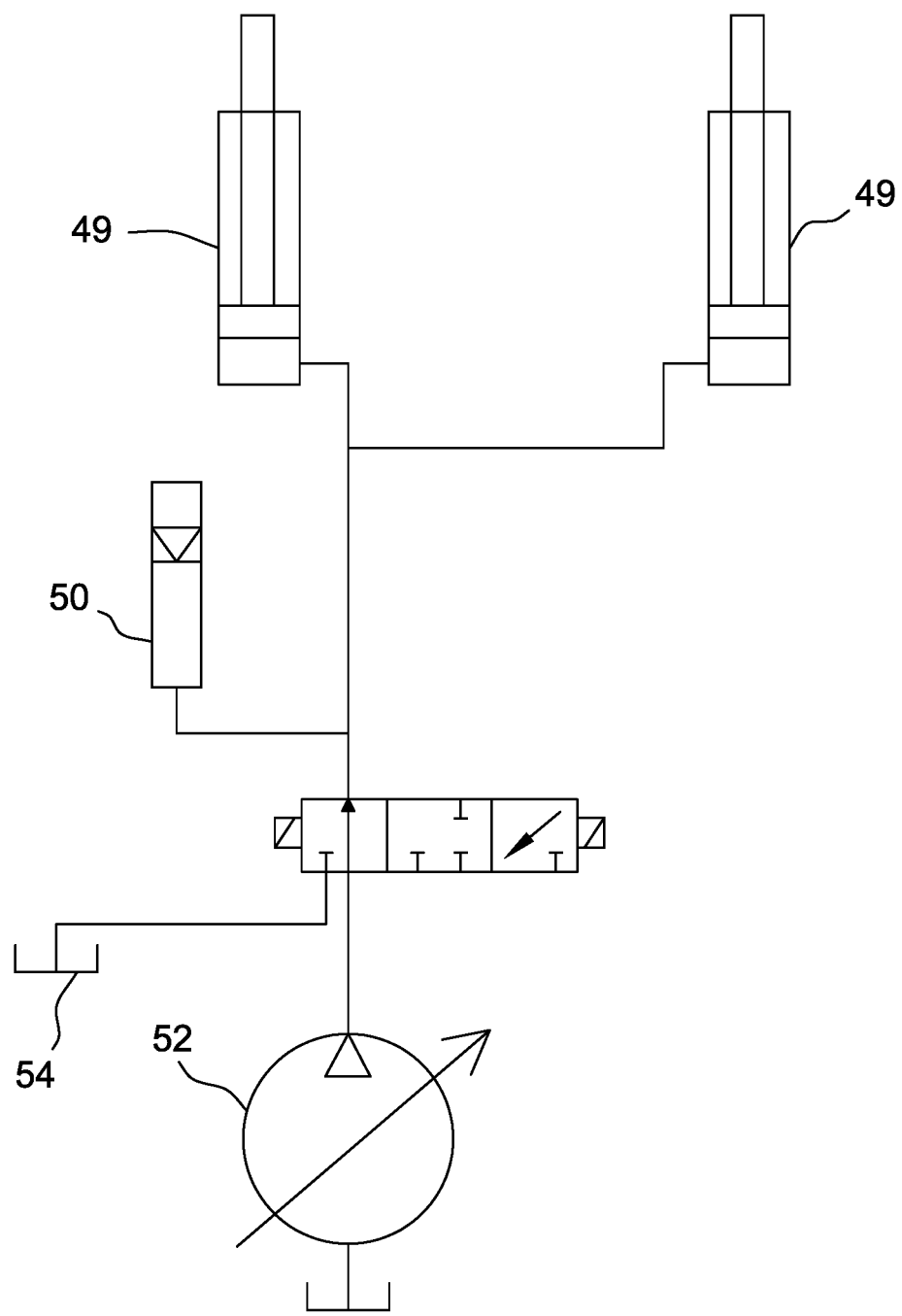
FIG. 9 is a schematic view of the baling vehicle showing a hydraulic suspension system.

The hub 35 and shaft 37 form a swivel joint 43. The first and second front caster wheels 27 of the caster assemblies 31 are each connected to a subframe 41 by the swivel joint 43. The subframes 41 are suspended from the chassis 9 by a mechanism having a suspension element 49, shown as a hydraulic cylinder in the illustrated embodiment. With reference to FIG. 9, each cylinder 49 may be connected to an accumulator 50 in the suspension system with the hydraulic fluid being provided from a source 54 by a hydraulic pump 52. Other suspension elements such as shock absorbers may be used in other embodiments.

Each subframe 41 is also pivotally attached to the chassis 9 at an outer pivot point $P_1$ and an inner pivot point $P_2$. In this arrangement, the chassis 9 is supported by the subframes 41 and the chassis 9 and components carried by the chassis (e.g., operator station) may move up and down relative to the subframes 41 as the vehicle 1 travels over uneven terrain.

Figure 4:
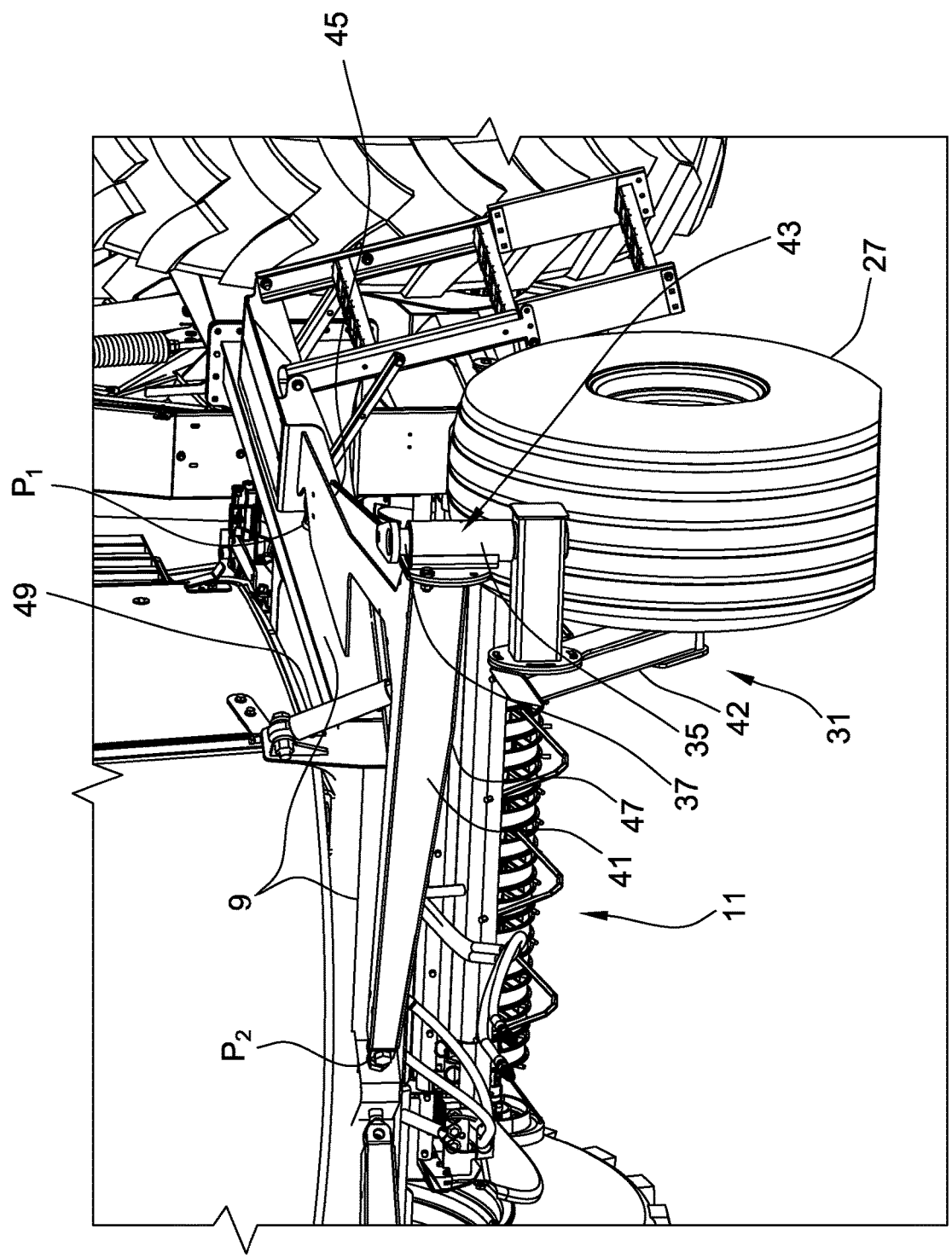
FIG. 4 is a perspective view of a caster assembly of the self-propelled baling vehicle.

As shown in FIG. 4, the subframe 41 has a longitudinal arm 45 (or "first arm") and lateral arm 47 (or "second arm") that each extend from the chassis 9. The swivel joint 43 is at the point at which the arms 45, 47 meet and is forward of the inner and outer pivot points $P_1$, $P_2$ relative to a longitudinal axis A (FIG. 3) of the vehicle 1. The swivel joint 43 is also outward to both the inner and outer pivot points $P_1$, $P_2$ relative to the lateral axis B (FIG. 3) of the vehicle 1 (i.e., the outer pivot point $P_1$ of each subframe 41 is positioned between the inner pivot point $P_2$ and the point of attachment of the suspension element 49 relative to the lateral axis B).

Figure 10:
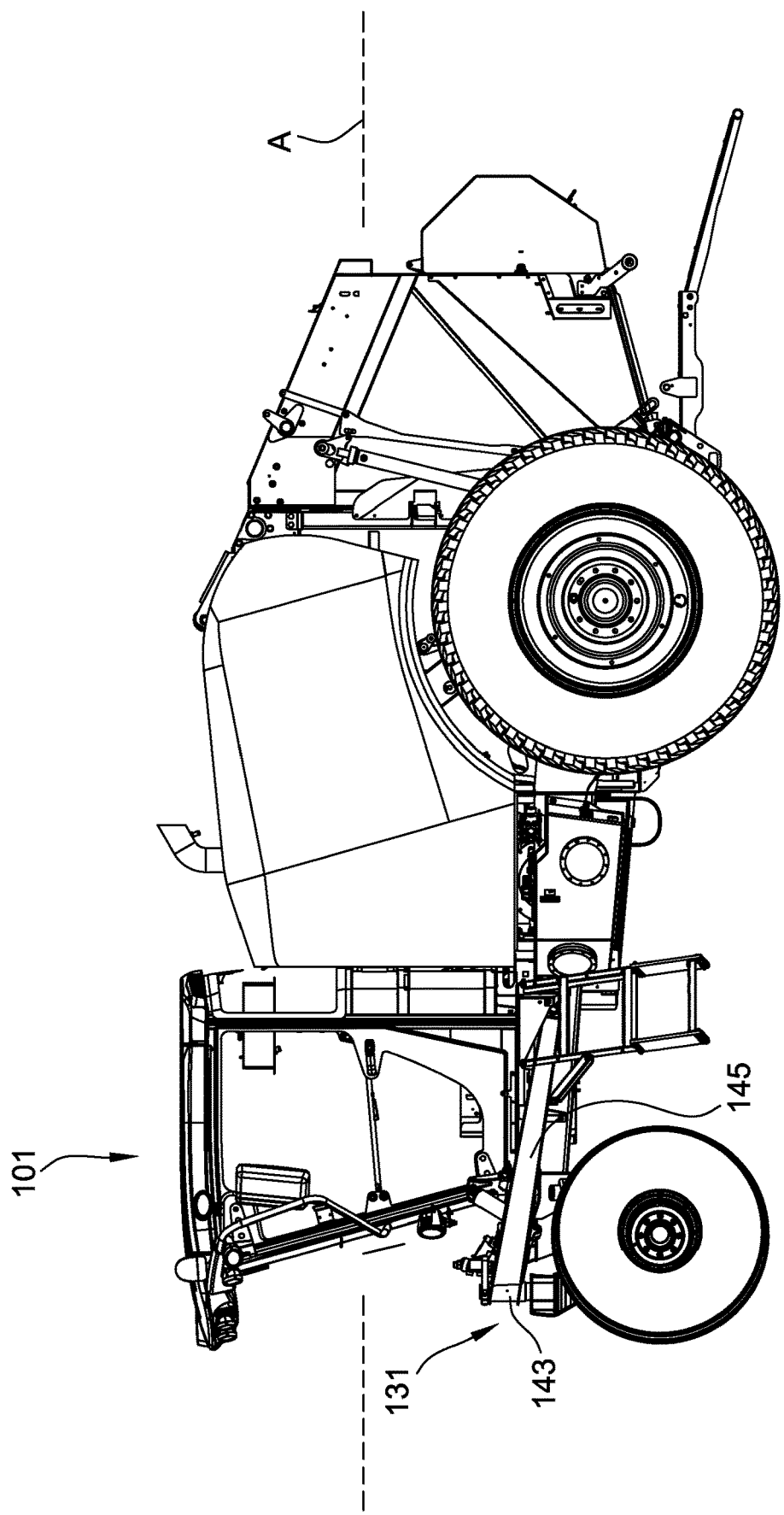
FIG. 10 is a side view of another embodiment of a self-propelled baling vehicle.
Figure 11:
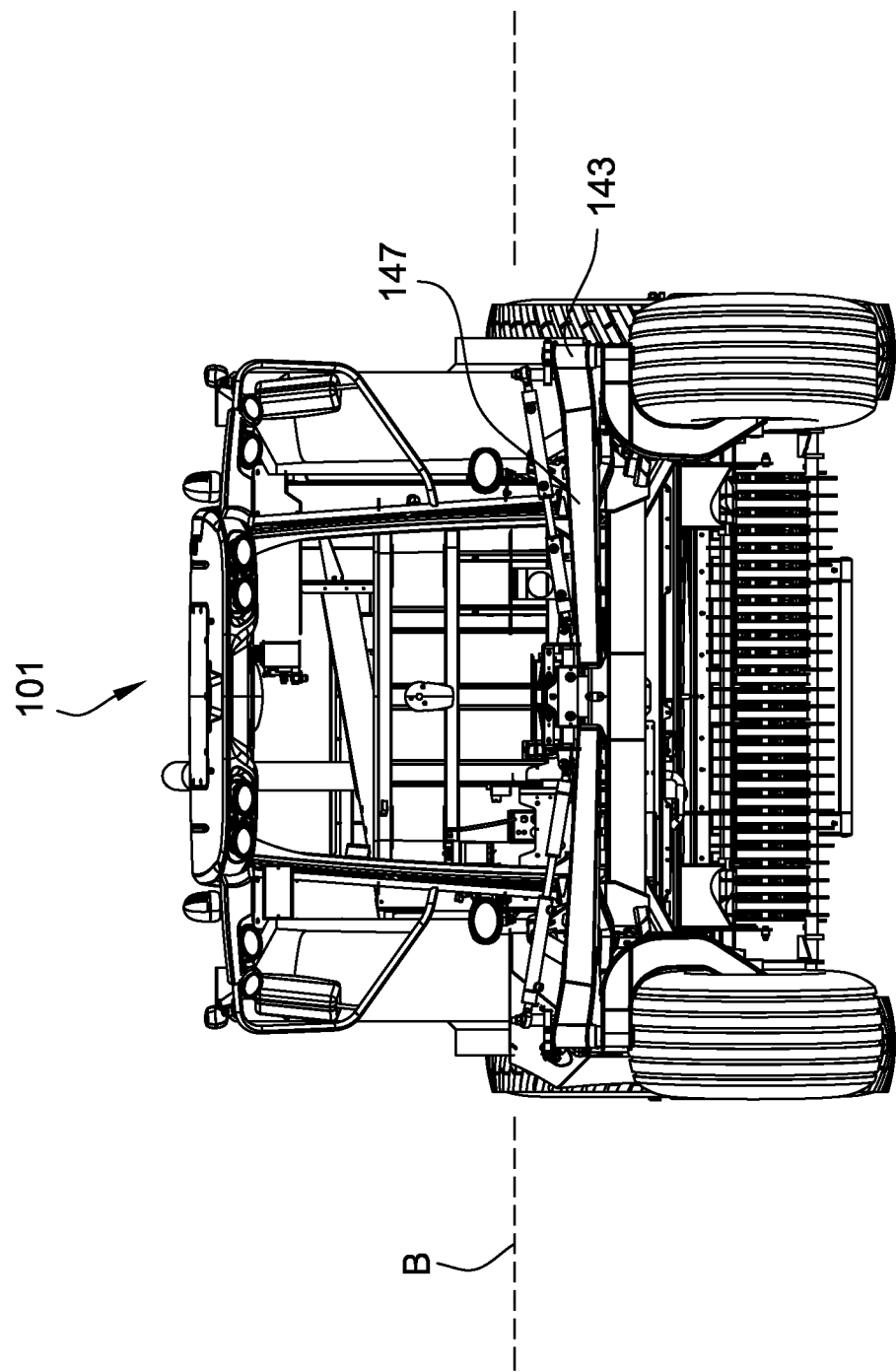
FIG. 11 is a front view of the self-propelled baling vehicle of FIG. 10.

In the illustrated embodiment, the first arm 45 is generally parallel to the longitudinal axis A (FIG. 3) and the second arm 47 is generally parallel to the lateral axis B. In other embodiments (FIGS. 10-11), the first arm 145 is angled upward toward the swivel joint 143 with respect to the longitudinal axis A. In the embodiment illustrated in FIGS. 10-11, the second arm 147 is generally parallel to the lateral axis B.

As shown in FIG. 1, the first and second front caster wheels 27 (i.e., the axes of rotation $R_{27}$ of each wheel) are offset from the swivel joint 43 relative to the longitudinal axis A (FIG. 3) of the vehicle. The offset allows the first and second front caster wheels 27 to self-align with the direction of travel of the vehicle 1 as the vehicle is steered by differences between the speeds of the rear wheels 17.

The offset of the caster wheels (i.e., distance between the axis of rotation $R_{27}$ of the wheel and the swivel joint 43 relative to the longitudinal axis A) may be at least 4 inches, at least about 8 inches or from about 8 to about 20 inches. These ranges are exemplary and other ranges may be used unless stated otherwise.

In other embodiments and/or in different modes of operation the front caster wheels 27 are steered. In such embodiments, the offset may be eliminated.

The caster assemblies 31 allow the first and second front caster wheels 27 to self-align with the direction of travel of the vehicle while it is steered by the difference in the speed of rotation of the rear wheels 17. In some embodiments, the first and second front caster wheels 27 pivot independently from each other. In other embodiments, the first and second front caster wheels 27 are connected through linkages (e.g., as in an Ackerman steering arrangement).

Generally, the front caster wheels 27 are freely pivotable (i.e., are not steered or otherwise controlled) during baling operation. In other embodiments, the front caster wheels are steered, such as during one or more various modes of operation. Caster wheel steering may be enabled by a steering system 19 (FIG. 8) having a steering mechanism 67 (shown as a steering wheel) connected to a steering actuator 53 which is connected to adjustable length tie rods 61. The steering actuator 67 may be a hydraulic cylinder such as a double acting hydraulic cylinder having a through-rod 65 that extends from each side which pushes/pulls the tie rods 61 to commonly align the caster wheels 27. Each tie-rod 61 is shown as a three-position cylinder 63 (which may be referred to herein as a "floating cylinder"). The barrels of each cylinder 63 are each connected to a hydraulic system 83 that regulates the fluid flow to the cylinders 63. The hydraulic system 83 includes a pump 85, a valve 87 and a hydraulic fluid tank 89. The hydraulic system 83 is configured to pressurize the cylinders 63 to lock the tie-rods 61 in the caster wheel steering mode and to allow the cylinders 63 to float in a drive wheel steering mode.

The vehicle 1 may be selectively steered in a drive wheel steering mode by controlling the rate and direction of rotation of the drive wheels 17. In the drive wheel steering mode, the cylinders 63 float (i.e., freely retract and extend) to allow the caster wheels 27 to self-align with the direction of travel of the vehicle. In the cater-wheel steering mode, the floating cylinders 63 are locked, which allows movement of the steering actuator 63 to be translated to the caster wheels to steer the caster wheels 27.

As shown in FIG. 1, the rear wheels 17 have a diameter larger than the front caster wheels 27. In some embodiments, the ratio of the diameter of the rear wheels 17 to the diameter of the front caster wheels 27 is at least about 1.25:1 or at least about 1.5:1 or even at least about 3:1. The front caster wheels 27 may have a diameter of at least about 20 inches or even at least about 30 inches, at least about 40 inches or even at least about 50 inches.

Figure 5:
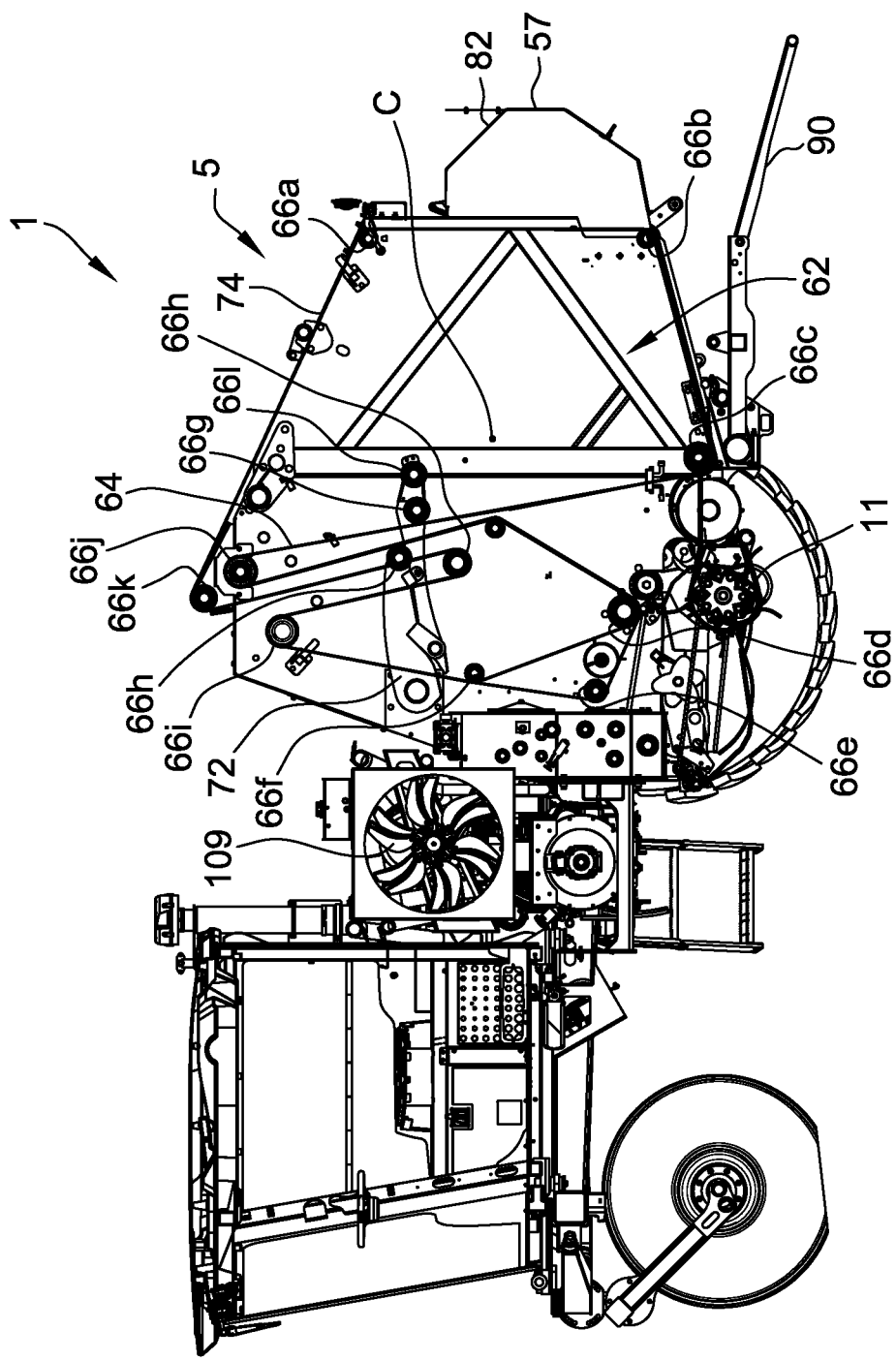
FIG. 5 is cross-sectional side view of the self-propelled baling vehicle showing the baling chamber.
Figure 6:
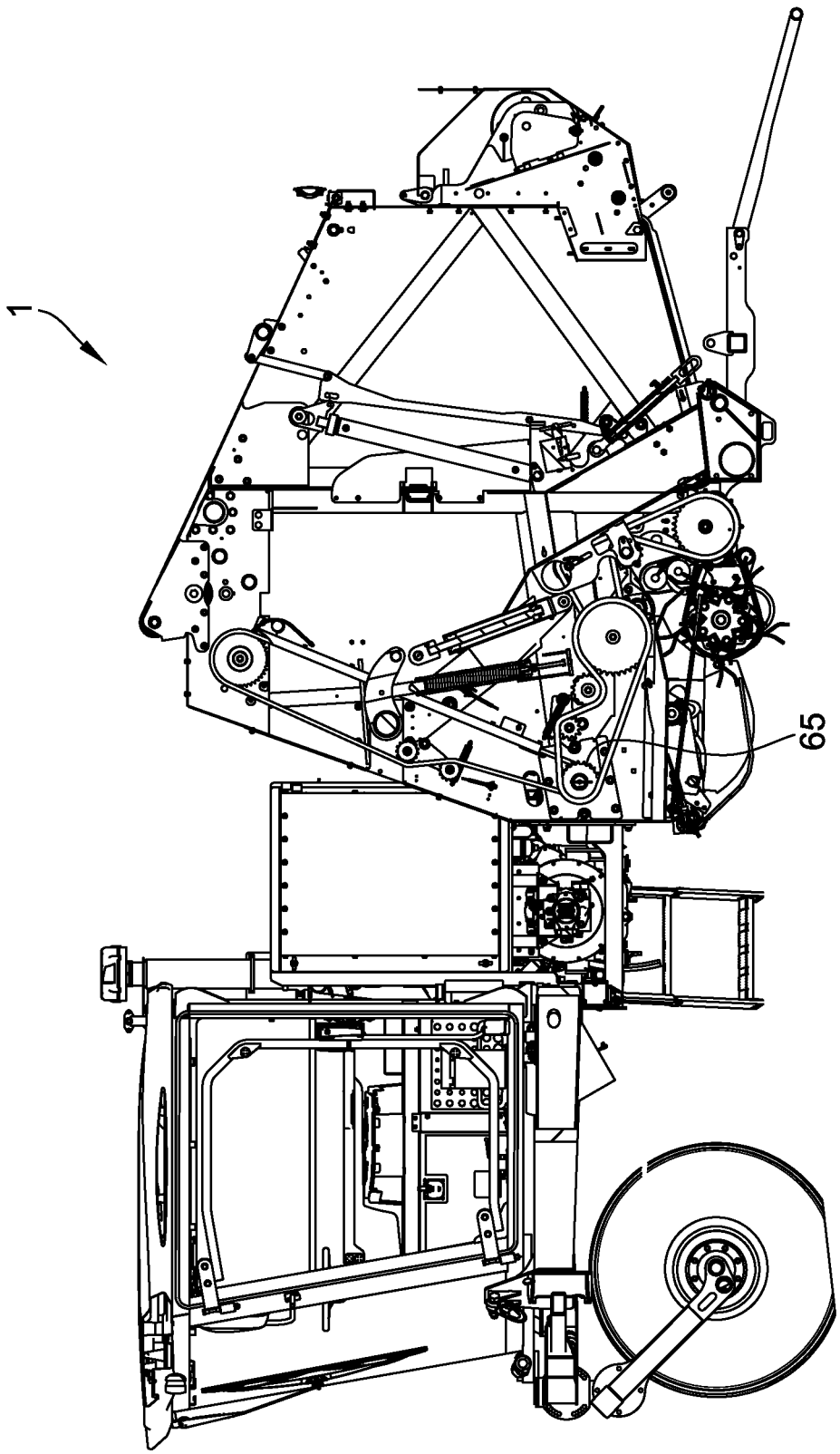
FIG. 6 is cross-sectional side view of the self-propelled baling vehicle showing a portion of the baler drive system.

With reference to FIG. 5, the vehicle 1 includes a baling device 5 that includes an expandable baling chamber 62 for forming a bale. In the illustrated embodiment, the baling device 5 is cylindrical to form cylindrical bales (i.e., round bales). The baling device 5 operates by utilizing a series of bale forming belts 64 routed around a series of rollers 66a-1. Alternatively, a single bale forming belt may be utilized. Additionally, the baling device 5 includes a drive gear 65 (FIG. 6) that is driven by a baler motor. The drive gear 65 is connected to several rollers 66 to rotate the belts 64 during bale formation and during bale wrapping sequences. The baling device 5 also includes one or more belt tighteners 72 (FIG. 5). It should be noted that any of the known round baler device arrangements may be used as the baler device 5 including, variable chamber balers (as shown) and fixed chamber balers. The baler device may include a single drive motor as shown or may include two or more drive motors. The drive motor may be positioned at other sprocket locations.

The baler device 5 includes a pick-up device 11 (FIG. 2) to pick-up crop or forage material. The pick-up device 11 is shown in a raised position. During baling, the pick-up device 11 is in a lowered position in which the rotating teeth 29 of the device 11 contact the crop or forage material and direct it toward the baling chamber 62. As material is picked up by the pick-up device 11, and deposited in the baling chamber 62, the material is compressed by the plurality of bale forming belts 64. Rotation of the pick-up device 11 is driven by a separate motor (e.g., hydraulic motor).

Tension is maintained in the bale forming belts 64 by one or more belt tighteners 72 to ensure a properly compressed bale. Once a full bale (not shown) is formed, the vehicle is stopped and a wrapping sequence is commenced by a wrapping mechanism 82. The wrapping mechanism 82 is configured to apply one or more layer of wrap material to the outer circumference of the completed bale. The wrap material is spooled on a roll. A linear actuator directs wrap material into contact with the outer perimeter of the completed bale. The bale device drive motor powers the belts to cause the bale to continue to rotate to pull the wrap material from the supply roll and onto the circumference of the bale. After the wrap sequence is complete, the wrap material is cut. The wrap material may include a variety of materials suitable for retaining the shape of the bale, protecting the bale and for limiting exposure of the bale to moisture. Rope-like twine, sheet-type netwrap, plastic or fabric sheets, or film-type sheets are just some examples of commonly used wrap material.

Once the wrapping sequence is completed, the completed bale is ejected from the baling chamber 62 by initiating opening of a tailgate 74. The baling device 5 includes a discharge ramp 90 that causes the bale to roll away from the vehicle 1 to clear the tailgate 74 as the tailgate closes. The ramp 90 may be lowered as the tailgate 74 opens and raised before the tailgate closes to push the bale further away from the tailgate.

The vehicle 1 includes an engine 101 (e.g., gas or diesel powered engine) that drives one or more hydraulic pumps which in turn power the various hydraulic motors and cylinders (e.g., first and second drive wheel motors, baling chamber motor, pick-up device motor, pick-up device lift cylinder, tailgate cylinder and/or ramp cylinder). The engine 101 also provides power for the electrical systems of the vehicle 1. The engine 101 is between the rotational axes $R_{17}$ of the rear drive wheels 17 and the rotational axes $R_{27}$ of the front caster wheels 27.

Figure 7:
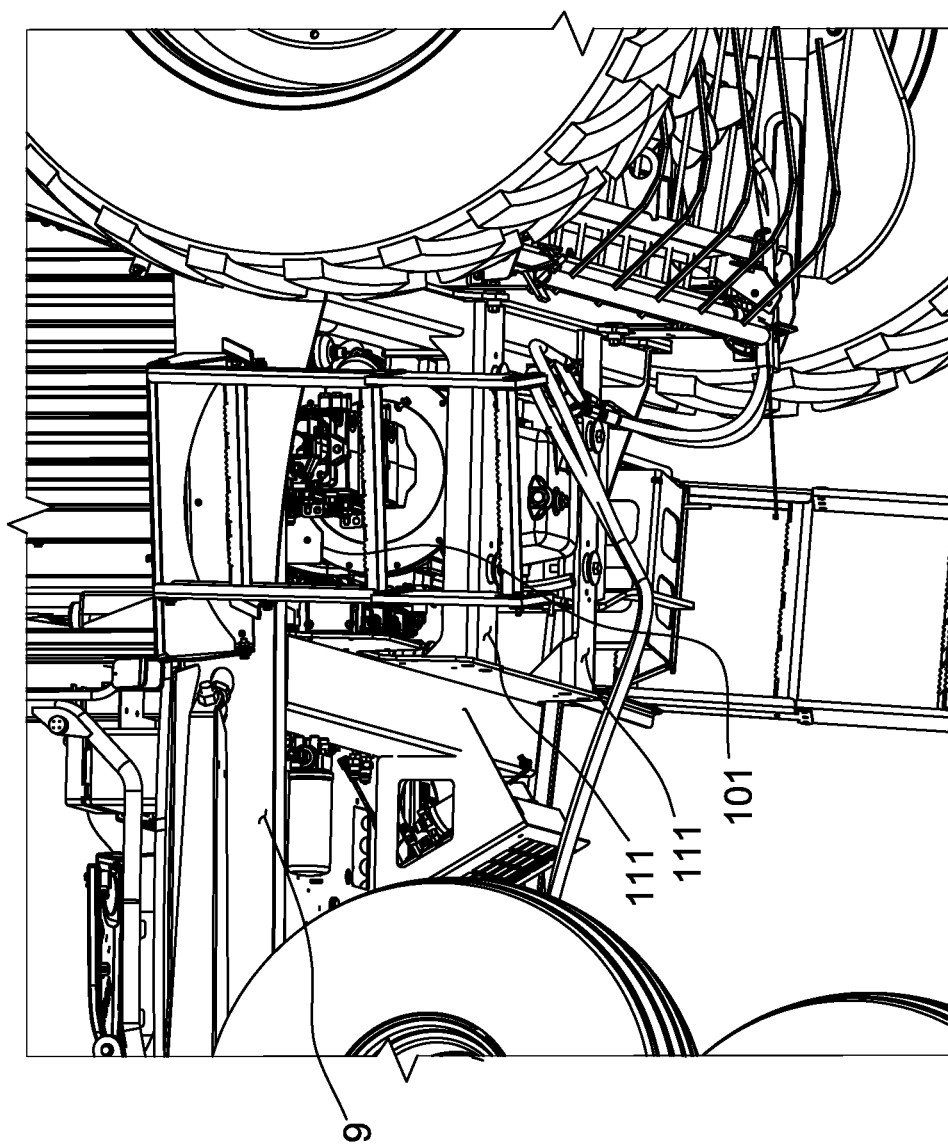
FIG. 7 is perspective view of the self-propelled baling vehicle showing the engine mounting brackets.

The engine 101 is arranged transverse to the longitudinal axis A of the vehicle 1. The engine 101 is supported by engine isolators and mounting brackets 111 (FIG. 7) that are attached to the chassis 9. The engine 101 includes a radiator 105 (FIG. 1) and a cooling fan 109 (FIG. 5) that forces air across the radiator 105. The fan 109 directs air in a direction transverse to the longitudinal axis A.

Figure 12:
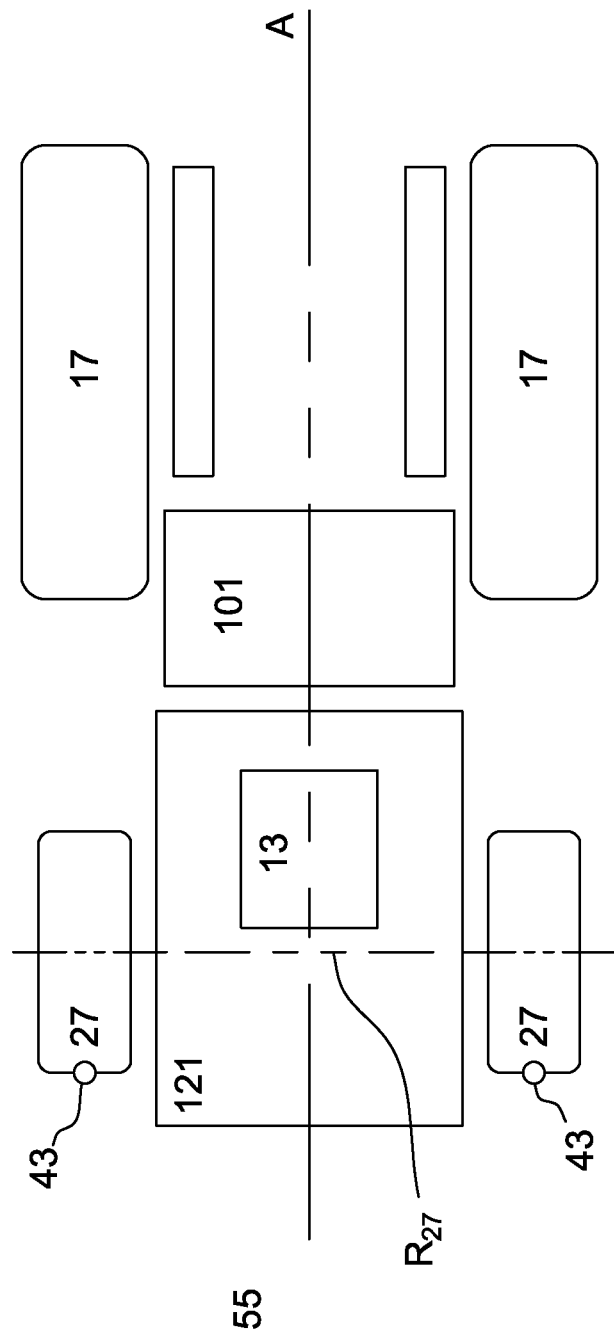
FIG. 12 is a schematic top view of a self-propelled baling vehicle.

As shown in FIGS. 1 and 12, the engine 101 is disposed between the baling chamber 62 and the cab 121 enclosing the operating station 13. In some embodiments, the "operator station" comprises the seat and controls for steering and controlling the speed of the vehicle 1. The operator station 13 is enclosed in a cab 121 (FIG. 1). As shown in FIG. 1, the operator station 13 is forward of the baling device 5, forward of the rotational axis $R_{17}$ of the rear drive wheels 17 and is also forward to the engine 101.

At least a portion of the operator station 13 and/or cab 121 are disposed above the caster wheels 27 (i.e., above the caster wheels 27 when generally aligned with the longitudinal axis A as the vehicle is propelled forward.) Stated otherwise, at least a portion of the operation station 13 and/or cab 121 overlap the front caster wheels 27 relative to the longitudinal axis A (e.g., overlap a trailing portion of the caster wheel, overlap the caster wheel axle or overlap the entire caster wheel when the caster wheels 27 are generally aligned with the longitudinal axis A as the vehicle is propelled forward). Generally, the cab 121 and operation station 13 (e.g., operator seat) are not reversible.

A distance $D_1$ (FIG. 1) separates the rotational axis $R_{17}$ of the rear drive wheels and the rotation axis $R_{27}$ of the front caster wheels 27. In some embodiments, D1 is at least about 80 inches, at least about 100 inches or at least about 125 inches (e.g., from about 80 inches to about 200 inches, from about 100 inches to about 180 inches or from about 110 inches to about 150 inches). In some embodiments, the vehicle 1 has a width (from first side 58 to second side 59) with the wheelbase (D1) being less than the width.

In some embodiments, the distance $D_2$ between the rear wheel rotational axis $R_{17}$ and the operator station 13 is at least about $0.4*D_1$ (i.e., the operator station is forward $R_{17}$ by at least about 40% of the distance between the axis $R_{17}$, $R_{27}$), or at least about $0.5*D_1$ or even at least about $0.6*D_1$. In some embodiments, the distance $D_3$ between the rear wheel rotational axis $R_{17}$ and the back of the cab 121 is at least about $0.3*D_1$ or at least about $0.4*D_1$ or even at least about $0.5*D_1$.

The baling chamber 62 has a central axis C that is transverse to the longitudinal axis A of the vehicle and that intersects the center of mass of a completed bale (i.e., the rotational axis of the bale as in round bales) after the bale is formed in the chamber 62. The central axis C of the baling chamber 62 may be positioned on the vehicle such that at least about 60% or even at least about 70%, or even at least about 80% (e.g., about 75% to about 85%) of the weight of the vehicle is supported by the rear wheels 17. In various embodiments, this may be achieved by positioning the center axis C of the baling chamber 62 at or behind the rotational axis $R_{17}$ of the rear drive wheels 17 relative to the longitudinal axis A of the vehicle 1 (i.e., is between the rotational axis $R_{17}$ and the rear end 57 of the vehicle 1). In some embodiments, the center axis C of the baling chamber 62 may be forward to the rotational axis $R_{17}$ of the rear drive wheels 17 with the distance between the central axis C of the baling chamber 62 and the rotational axis $R_{17}$ being less than about $0.25*D_1$, or less than about $0.15*D_1$ or even less than about $0.10*D_1$.

To measure the percentage of the total weight of the vehicle 1 supported by the rear wheels 17, the vehicle 1 may be weighed on a scale with only the rear wheels 17 resting on the scale.

The central axis of the baling chamber generally corresponds to the center axis of a completed bale (i.e., fully formed bale) which may be determined by any suitable manner. In some embodiments, the central axis is determined by determining the outer circumference of the bale as defined by the position of the baler rollers 66 and/or belts 64.

Compared to conventional baling implements, the self-propelled baling vehicle has several advantages. By incorporating front caster wheels and hydraulic rear drive wheels that rotate independently, the baling vehicle is highly maneuverable and is able to turn within its own footprint (i.e., with a zero-turn radius). This allows the vehicle to be turned quickly such as for repositioning prior to bale discharge to prevent bales from rolling down an incline during bale discharge. By positioning the baling chamber toward the rear of the vehicle such that at least about 60% or even at least about 70% (e.g., 75% to about 85%) of the weight of the vehicle is placed on the rear drive wheels, the balance, performance, and traction of the vehicle may be improved. Less weight (20% to about 40%) is then suspended at the front of the vehicle at which the operator station is positioned which improves the quality of ride for the operator. By positioning the engine transverse to the longitudinal axis of the vehicle, the wheelbase may be shortened and chaff may be blown crossway. In embodiments in which the baling vehicle includes two caster wheels, the two caster wheels can be spaced to allow a large opening for the windrow to pass to the baling chamber.

By positioning the operator station and cab relatively forward and near the front caster wheels (e.g., at least partially overlapping the rotational axis of the front wheels), the operator has a clear field of vision of the windrow. In addition, the operator station is near the suspension system (e.g., at least partially disposed above) which improves the operator ride and reduces operator fatigue.

As used herein, the terms "about," "substantially," "essentially" and "approximately" when used in conjunction with ranges of dimensions, concentrations, temperatures or other physical or chemical properties or characteristics is meant to cover variations that may exist in the upper and/or lower limits of the ranges of the properties or characteristics, including, for example, variations resulting from rounding, measurement methodology or other statistical variation.

When introducing elements of the present disclosure or the embodiment(s) thereof, the articles "a", "an", "the" and "said" are intended to mean that there are one or more of the elements. The terms "comprising," "including," "containing" and "having" are intended to be inclusive and mean that there may be additional elements other than the listed elements. The use of terms indicating a particular orientation (e.g., "top", "bottom", "side", etc.) is for convenience of description and does not require any particular orientation of the item described.

As various changes could be made in the above constructions and methods without departing from the scope of the disclosure, it is intended that all matter contained in the above description and shown in the accompanying drawing[s] shall be interpreted as illustrative and not in a limiting sense.

What is claimed is:

1. A self-propelled baling vehicle for forming a bale of material, the vehicle having a vertical axis and a longitudinal axis, the baling vehicle comprising:
   a chassis;
   first and second rear drive wheels attached to the chassis, the first and second rear drive wheels each having a rotational axis;
   drive systems for independently controlling a drive speed of each of the first and second rear drive wheels so that the speed of the first rear drive wheel is selectively controllable relative to a speed of the second rear drive wheel and so that differences in the first rear drive wheel speed and the second rear drive wheel speed enable vehicle steering;
   a front caster wheel connected to the chassis, the front caster wheel being mounted on a suspension mechanism to allow the front caster wheel to move toward the chassis relative to the vertical axis, the front caster wheel having a rotational axis, wherein a distance $D_1$ separates the rotational axes of the rear drive wheels and the rotational axis of the front caster wheel;
   a cab, the cab at least partially overlapping a portion of the front caster wheel relative to the longitudinal axis of the vehicle; and
   a baling chamber for forming the bale, the chamber having a central axis that is transverse to the longitudinal axis and intersecting a center of mass of the completed bale, the central axis being (1) at or rearward to the rotational axes of the first and second rear drive wheels or (2) forward to the rotational axes of the first and second rear drive wheels with the distance between the central axis and the rotational axes of the first and second rear drive wheels being less than about $0.25*D_1$.

2. The self-propelled baling vehicle as set forth in claim 1 wherein each drive system comprises a hydraulic drive motor.

3. The self-propelled baling vehicle as set forth in claim 1 wherein the vehicle has a front and a rear relative to the longitudinal axis, the front corresponding to a leading end of the vehicle and the rear corresponding to a trailing end of the vehicle relative to a direction of travel of the vehicle during bale formation, the central axis of the baling chamber being disposed between the rotational axes of the rear drive wheels and the rear of the vehicle relative to the longitudinal axis.

4. The self-propelled baling vehicle as set forth in claim 1 wherein the vehicle comprises an engine for propelling the vehicle, the engine being disposed between a rotational axis of the front caster wheel and the rotational axes of the rear drive wheels.

5. The self-propelled baling vehicle as set forth in claim 1, further comprising an operator station, at least a portion of the operator station being above the front caster wheel.

6. The self-propelled baling vehicle as set forth in claim 1 further comprising an operator station, there being a distance $D_2$ between the rear wheel rotational axis and the operator station, $D_2$ being at least about $0.4 D_1$.

7. The self-propelled baling vehicle as set forth in claim 1 wherein the front caster wheel is a first front caster wheel, the vehicle comprising a second front caster wheel connected to the chassis, each front caster wheel being mounted on a suspension mechanism to allow the front caster wheels to move toward the chassis relative to the vertical axis.

8. The self-propelled baling vehicle as set forth in claim 1 wherein there is a distance $D_3$ between the rear wheel rotational axis and the cab, $D_3$ being at least about $0.3*D_1$.

9. The self-propelled baling vehicle as set forth in claim 1 wherein, in a drive wheel steering mode, the front caster wheel is freely pivotal with respect to the chassis such that the front caster wheel pivots with respect to the chassis in response to differences in the first rear drive wheel speed and the second rear drive wheel speed.

10. The self-propelled baling vehicle as set forth in claim 1 wherein the central axis of the baling chamber is at or rearward to the rotational axes of the first and second rear drive wheels.

11. The self-propelled baling vehicle as set forth in claim 1 wherein the central axis of the baling chamber is forward to the rotational axes of the first and second rear drive wheels with the distance between the central axis and the rotational axes of the first and second rear drive wheels being less than about $0.25*D_1$.

12. A self-propelled baling vehicle for forming a bale of material, the baling vehicle having a weight and comprising:
   a chassis;
   first and second rear drive wheels attached to the chassis, the first and second rear drive wheels each having a rotational axis, at least about 60% of the weight of the vehicle being supported by the rear drive wheels;
   drive systems for independently controlling a drive speed of each of the first and second rear drive wheels so that the speed of the first rear drive wheel is selectively controllable relative to a speed of the second rear drive wheel and so that differences in the first rear drive wheel speed and the second rear drive wheel speed enable vehicle steering;
   a front caster wheel connected to the chassis;
   a cab, the cab at least partially overlapping a portion of the front caster wheel relative to a longitudinal axis of the vehicle; and
   a baling chamber for forming the bale.

13. The self-propelled baling vehicle as set forth in claim 12 wherein at least about 70% of the weight of the vehicle is supported by the rear drive wheels.

14. The self-propelled baling vehicle as set forth in claim 12 wherein the cab being above the front caster wheel relative to a vertical axis of the vehicle.

15. The self-propelled baling vehicle as set forth in claim 12 wherein the vehicle comprises an engine for propelling the vehicle, the engine being disposed between a rotational axis of the front caster wheel and the rotational axes of the rear drive wheels.

16. The self-propelled baling vehicle as set forth in claim 12 wherein each drive system comprises:
   a hydraulic motor to rotate the rear drive wheel; and
   a hydraulic pump fluidly connected to the hydraulic motor, the baling vehicle further comprising a control unit to control an output of each hydraulic pump.

17. A self-propelled baling vehicle for forming a bale of material, the baling vehicle comprising:
   a chassis;
   first and second rear drive wheels attached to the chassis, the first and second rear drive wheels each having a rotational axis;
   drive systems for independently controlling a drive speed of each of the first and second rear drive wheels so that the speed of the first rear drive wheel is selectively controllable relative to a speed of the second rear drive wheel and so that differences in the first rear drive wheel speed and the second rear drive wheel speed enable vehicle steering;

a front caster wheel connected to the chassis;

a cab enclosing an operator station, the cab at least partially overlapping a portion of the front caster wheel relative to a longitudinal axis of a vehicle;

a baling chamber for forming the bale; and an engine for propelling the vehicle, the engine being disposed between the cab and the baling chamber.

18. The self-propelled baling vehicle as set forth in claim 17 wherein the cab is above the front caster wheel relative to a vertical axis of the vehicle.

19. The self-propelled baling vehicle as set forth in claim 12 wherein the vehicle has a wheelbase and a width, the wheelbase being less than the width.

20. The self-propelled baling vehicle as set forth in claim 17 wherein the vehicle has a wheelbase and a width, the wheelbase being less than the width.

\* \* \* \* \*